United States Patent [19]

Satzke

[11] Patent Number: 4,905,967
[45] Date of Patent: Mar. 6, 1990

[54] INTERFACE DESIGN OF TWO CLAMPED-TOGETHER PARTS

[75] Inventor: Richard Satzke, Ketsch, Fed. Rep. of Germany

[73] Assignee: Deere & Company, Moline, Ill.

[21] Appl. No.: 3,421

[22] Filed: Dec. 29, 1986

Related U.S. Application Data

[63] Continuation of Ser. No. 671,643, Nov. 15, 1984.

[51] Int. Cl.⁴ .............................................. F16K 43/00
[52] U.S. Cl. ................................... 251/367; 137/315; 137/596; 251/250
[58] Field of Search ................ 251/367, 250; 137/315, 137/596

[56] References Cited

U.S. PATENT DOCUMENTS

| | | | |
|---|---|---|---|
| 1,348,667 | 8/1920 | Snyder | 285/328 |
| 2,879,788 | 3/1959 | Becket et al. | 251/367 |
| 3,060,970 | 10/1962 | Aslon | 251/367 |
| 3,202,170 | 8/1965 | Holbrook | 251/367 |
| 3,384,122 | 5/1968 | Harpman | 251/367 |
| 3,407,834 | 10/1968 | Brandenberg | 251/367 |
| 4,401,293 | 8/1983 | Rodewald et al. | 251/367 |

FOREIGN PATENT DOCUMENTS

| | | |
|---|---|---|
| 1550067 | 9/1970 | Fed. Rep. of Germany . |
| 2749184 | 5/1979 | Fed. Rep. of Germany . |
| 233429 | 5/1925 | United Kingdom . |

Primary Examiner—A. Michael Chambers

[57] ABSTRACT

Two control valve housings each have a longitudinal bore receiving a valve spool. The housings are clamped together by two pairs of bolts located one on each side of the bores. Formed on one of the parts at the interface of the two parts and at opposite sides of each bolt is a pair of roughened surface areas which are prepared by milling or stamping. By means of such a surface preparing method projections are created which are deformed and serve as spacers between the two parts when they are clamped together. The two parts then touch themselves only in the roughened surface areas. Thus, when the two parts are clamped together any distortion in the area of the longitudinal bore is avoided and the valve spool can move in the longitudinal bore, noneffected by the force acting on the two parts.

5 Claims, 2 Drawing Sheets

INTERFACE DESIGN OF TWO CLAMPED-TOGETHER PARTS

This application is a continuation of application Ser. No. 671,643 filed Nov. 15, 1984.

BACKGROUND OF THE INVENTION

The invention concerns at least two parts that are clamped together with at least one of the parts having a cavity receiving a moving part and having spacers in the region of the confronting clamping surfaces at the interface of the two parts.

German Patent No. 1,550,067 discloses one assembly of two clamped-together parts wherein the parts are approximately cuboid in shape and represent a valve housing and a valve baseplate of a valve housing unit. This valve housing also has a cover, and three screws extend through holes bored in the cover and in the valve housing into threaded holes in the valve baseplate. The valve housing has an axial bore that extends along the center of and parallel to the long surface of the valve housing. The valve baseplate has various inlet and outlet channels that carry liquid under pressure or not under pressure to or from a device. The flow of fluid to and from inlet and outlet channels and hence to and from the device is controlled by means of a valve spool located in and having lands fitted to the axial bore. In order to prevent the occurrence of stresses on the valve housing that might result in deformation of the housing and binding of the valve spool when the screws are tightened, the three screws are arranged so that they define the points of a triangle to achieve a stress-free three-point support. Moreover, mounted on the screws at the interface of the valve housing and the valve baseplate are spacers in the form of approximately 0.79 mm thick washers, which are intended to prevent the valve housing and the valve baseplate from touching at points outside the spacers, since otherwise the support would no longer be at only three points and stresses due to irregularities at the opposing points of the two parts would occur. In addition, a gasket is located at the interface of the valve housing and the valve baseplate to prevent loss of liquid from the inlet and outlet channels and which is compressed by the opposing sides of the valve housing and valve baseplate by the screws.

Granted, a pure three-point contact in practice would be a conceivable way of avoiding stresses in a valve housing as the screws are tightened. In fact, however, only a theoretical approximation to the ideal three-point contact has been achieved. In addition, the washers can easily be displaced when the parts are assembled and thus no longer fulfill their function. Finally, in the case of large valve housing units, the distances between the screws are so great that the clamping forces between the screws no longer suffice to compress the gasket between the valve housing and the valve baseplate sufficiently to form a liquid-tight seal.

SUMMARY OF THE INVENTION

The task on which the invention is based is then to design at least one of the parts so that the part that contains the movable part is not stressed when the clamping force is applied.

This task is solved according to the invention by forming the spacers at least in part by means of integral, deformable knurling of the material.

In this way, the spacers can be formed by simple material knurling and loose parts can be avoided. The position and size of the knurling can thus be dependent on the sizes of the two parts and need not also be determined by a specific placement of the screws.

The deformability of the knurling in the material permits equalization in height in the area of the contact surface and stresses are eliminated since the prestress required for the screws is achieved only by deformation of the knurling and not by contact with a relatively unyielding surface. Therefore, stresses in the part containing the moving part occurring between the clamping surfaces need not be feared when there is a deviation from the ideal three-point contact. Since, with the knurling, the spacers are necessarily of the same material as the part containing the moving part, no difficulties occur in use as a result of using different materials.

When two or more parts are clamped together, of which one is a valve housing with a sliding valve, then according to the invention, the region of the valve will be kept free of stresses by the fact that the knurling is located outside of the surface of the valve projected onto the interface between the two parts.

The clamping forces thus act to the side of the valve and never on the valve bore itself. This is especially important when the valve housing containing the valve has very thin walls in the vicinity of the bore or is made of an easily deformed material.

The knurling in the material can be produced in a simple, economical way that is suitable for mass production, according to another suggestion of the invention, by forming peaks by milling or stamping. Especially in the case of stamping, it is possible to determine the shape and height of the knurling and fit them to the magnitude of the clamping forces by means of the shape of the stamp and the pressure acting on it. This results in a particularly simple method by which stresses in the region of the bore can be avoided.

If, according to an additional feature of the invention, the peaks of the material undergo plastic deformation, then a flattening of the peaks will occur only during the first application of the clamps, and will depend on the magnitude of the clamping forces, which may be determined using a torque wrench, and after separating the two parts, when they are reassembled in the same position, the freedom from stresses will be maintained due to the preformed contact surfaces, which will not be altered further at the same clamping force.

When the sides of the parts are suitably designed, a sufficient freedom from stress is achieved if the knurling is 3/100 to 5/100 mm high.

The drawing represents an embodiment of the invention that will be described in greater detail in the following.

DESCRIPTION OF THE PREFERRED EMBODIMENT

Figure 1:
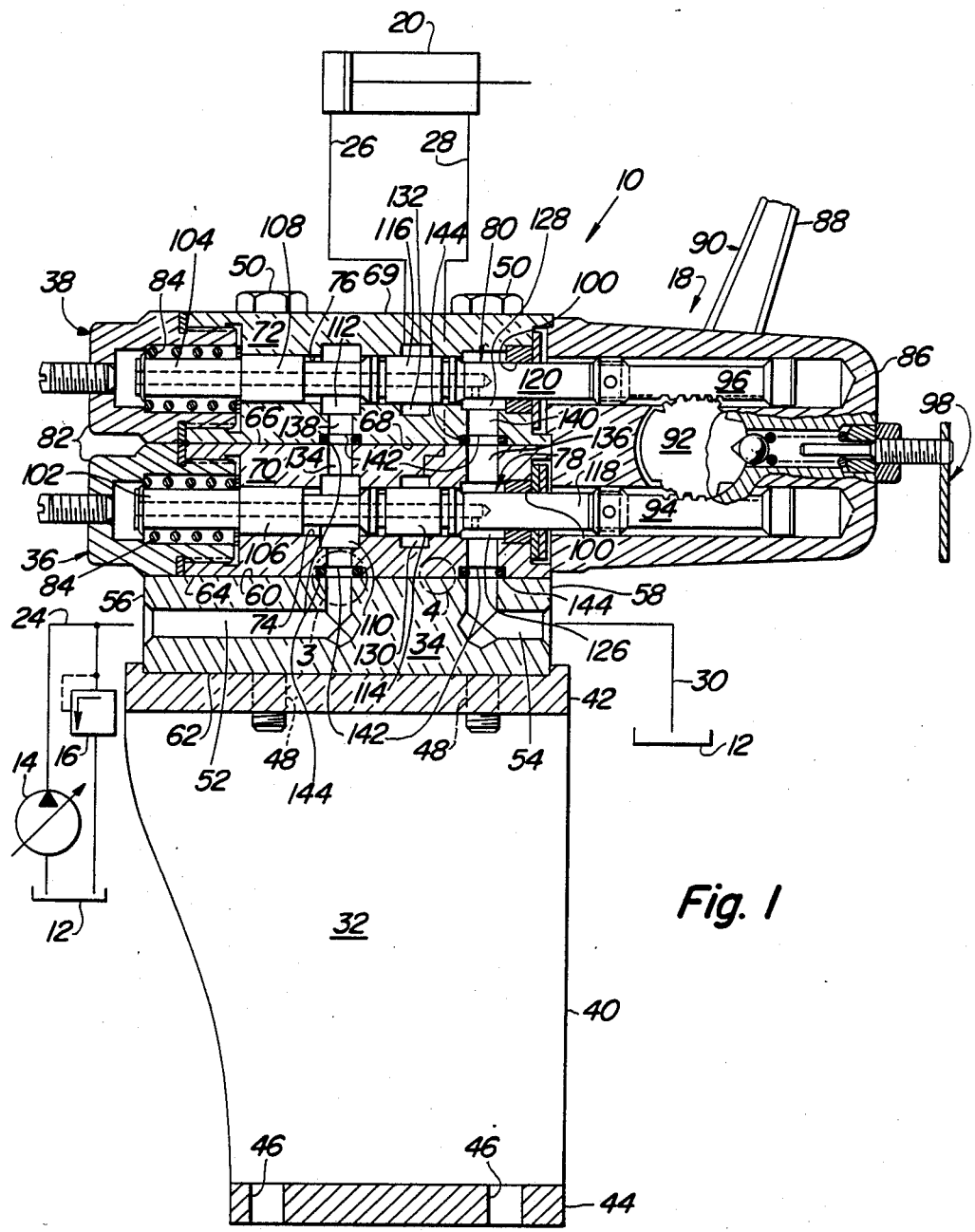
FIG. 1 is a view of the hydraulic circuit with a valve housing assembly.

A hydraulic circuit 10 shown in FIG. 1 consists of a reservoir 12, a pump 14, a pressure relief valve 16, a valve housing assembly 18, a device 20 and appropriate hydraulic lines. These include a suction line 22 between the pump 14 and the reservoir 12, a pressure line 24 between the pump 14 and the valve housing assembly 18, a first and a second device line 26 and 28 between the valve housing assembly 18 and the device 20 and a return line 30 between the valve housing assembly 18 and the reservoir 12. In this example, the pump 14 is a variable displacement pump and the device is a two-way hydraulic cylinder to which hydraulic fluid can be sent by the pump 14 on either the piston side or the rod side, as will be described below.

The valve housing assembly 18 consists essentially of a bracket 32 and three parts, namely, a baseplate 34 and lower and upper valve housings 36 and 38, respectively, which are assembled in that order. The bracket 32 is U-shaped and is arranged with a face 40 extending vertically between and joining upper and lower horizontal legs 42 and 44 and is attached to an unshown hydraulic unit, such as can be found on a tractor. The lower leg 44 contains holes 46 for unshown screws, which can be inserted into similarly unshown threaded holes on the tractor, while the upper leg 42 contains threaded holes 48 into which clamps in the form of screws 50, extending through the valve housing assembly 18, can be screwed. To the upper leg 42 is attached the baseplate 34. The baseplate 34 is in the form of a cuboid having short end surfaces 56 and 58 which extend between upper and lower planar surfaces 60 and 62. The baseplate 34 contains a pressure channel 52 having an entrance located in the surface 56 and connected to the pressure line 24 and contains a return channel 54 having an exit located in the surface 58 and connected with the return line 30. The connections are made by means of commercially available screw fittings, which are omitted here for the sake of simplicity. Unshown holes for the screws 50 extend through the baseplate 34 perpendicular to the surfaces 60 and 62. The lower valve housing 36 has lower and upper planar surfaces 64 and 66, respectively and the upper valve housing has lower and upper planar surfaces 68 and 69, respectively. The lower housing 36 is sandwiched between the upper housing 38 and the baseplate 34 so that a first interface exists at the confronting surfaces 60 and 64 and a second interface exists at the confronting surfaces 66 and 68. The upper and lower valve housings 38 and 36 are also cuboid in their central portions 70 and 72 and the holes 51 for the screws 50 extend through them perpendicular to their respective upper and lower surfaces. The holes 51 are bored at the edge of the long sides of the central portions 70 and 72, and in this example, there are two holes on each long side. Parallel to the upper and lower surfaces of the central portions 70 and 72 are axial bores 74 and 76, which respectively contain valve spools 78 and 80. The bores 74 and 76 run concentric with the central axis of the central portions 70 and 72. Attached to one end of each central portion 70 and 72 is an end cap 82 in which is located a restoring mechanism 84 that returns the associated valve spool 78 or 80 to a neutral position, and at the other end is a cap 86 that is common to the upper and lower valve housings 38 and 36. Inside the common cap 86 is an adjusting mechanism 90 that can be controlled by a lever 88 and consists of a rotating pinion 92 located between and meshed with racks of teeth formed on ends 94 and 96 of the valve spools 78 and 80. The pinion 92 can be held in various positions by means of a locking device 98. The pinion 92 operates when it is rotated by means of the lever 88 to displace the valve spools 78 and 80 in opposite directions. While the end caps 82 are attached liquid-tight, the cap 86 is not; and sealing is achieved by seals 100 slidably receiving the valve spools 78 and 80 and located in the housings 36 and 38 adjacent their connection to the cap 86.

Considered from left to right in FIG. 1, the valve spool 78 includes a left end 102, a first land 106, a second land 114 spaced axially from the land 106, and a shaft section 118 extending between the land 114 and the toothed end 94. The valve spool 80 is identical to the spool 78 and includes a left end 104, a first land 108, a second land 116 and a shaft section 120. The valve bores 74 and 76 are identical and include respective annular pressure chambers 110 and 112, annular device chambers 130 and 132 and annular return chambers 126 and 128, with these sets of like chambers being connected to each other. The supply pressure channel 52 is connected to the chamber 110 by a passage 134 that connects with a passage 138 leading to the chamber 112. The annular device chamber 132 of the upper valve housing 38 is connected to the first device line 26 and the annular device chamber 130 of the lower valve housing 36 is connected to the second device line 28. An outlet passage 136 leads from the return chamber 126 of the bore 74 to the outlet channel 54. The passage 136 connects to an outlet passage 40 leading from the return chamber 128 of the bore 76. On the undersides of the valve housings 36 and 38 annular recesses 142 are formed at respective lower ends of each o the passages 134, 36, 138 and 140 to hold gasket rings 144 that are clamped between the surfaces 60 and 64, and between the surfaces 66 and 68 when the valve housing assembly 18 is assembled by tightening the screws 50 so that a liquid-tight seal is achieved. The valve spools 78 and 80 can be jointly set to three different settings, namely an inlet setting, a neutral setting and an outlet setting with the spool 78 occupying its inlet setting only when the spool 80 occupies its outlet setting and vice-versa and with the spools 78 and 80 being in their neutral positions at the same time. In their neutral settings, as shown in FIG. 1, the valve spools 78 and 80 are in positions in which their lands 114 and 116 prevent the flow of liquid into or out of the annular device chambers 130 and 132. In order to move one of the spools 78 or 80 to its inlet setting, the particular spool 78 or 80 is moved rightwardly by appropriate rotation of the pinion 92 until the valve land 114 or 116 permits a connection between the annular device chamber 130 or 132 and the annular pressure chamber 122 or 124. At the same time, the other of the spools 78 or 80 will have moved leftwardly to its outlet setting wherein a connection is formed between the device chamber 130 or 132 and the outlet chamber 126 or 128. These settings are thus achieved only by sliding the spools 78 and 80 and therefore the latter must be installed in the axial bores 74 and 76 so that they are easy-running and liquid-tight. The tightness of the spools 78 and 80 in the axial bores 74 and 76 is achieved by choosing their tolerance so that no undesired flow of liquid can occur between the pressure, device and exhaust chambers 122 to 132.

Figure 2:
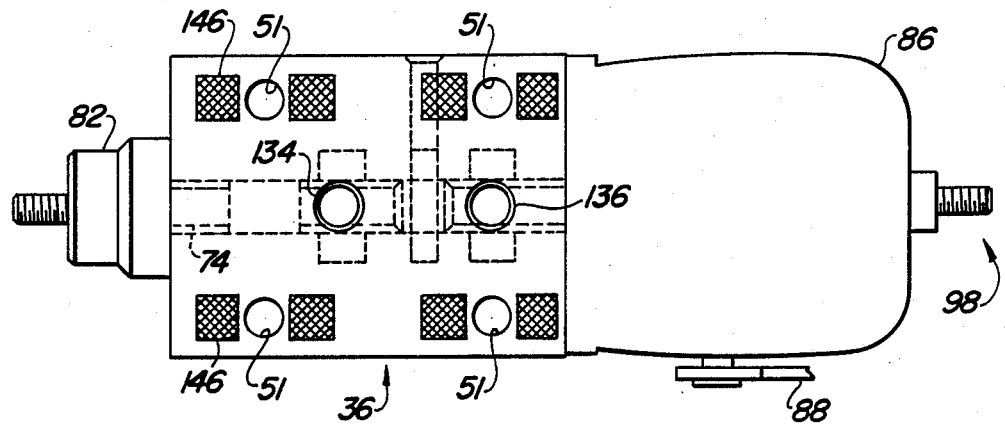
FIG. 2 is a view of the underside of a valve housing.

As shown in FIG. 2, the undersurface 64 of the lower valve housing 36 is machined in places, and roughened by milling or stamping. This is also the case on the undersurface 68 of the upper valve housing 38, although it is not visible. These points, which will be referred to in the following as contact surfaces 146, are located parallel to the longitudinal central axis of the axial bore 74 and on each side of it. They are distributed in lines more or less uniformly along the length of the underside of the central portion 70. In this embodiment, four contact surfaces 146 are prepared on each side of the valve spool on the undersurface 64 so that there is one of them on each side of each hole 51 for the screws 50. The surface roughness on the contact surfaces amounts to about 3/100 mm to 5/100 mm, i.e., these regions contain knurling in the material in the form of peaks 148 (FIG. 4) of approximately this height. The shape of the contact surfaces 146 is arbitrary; however, it should be the same for all of them. The remaining surface area of the undersurfaces 64 and 68 is either finely or coarsely ground so that a surface roughness of less than 3/100 mm results. Fine grinding, polishing or finishing is not necessary. In placing the contact surfaces 146, care should be taken that they not be located in the area of the projected surface of the valve spools 78 and 80 on the undersurfaces 64 and 68.

When assembling the valve housing assembly 18, the respective confronting surfaces of the bracket 32, the baseplate 34 and the upper and lower valve housings 36 and 38 are placed together, during which step the sealing rings 144 are to be placed in the recesses 142 between the baseplate 34 and the lower valve housing and between the upper and lower valve housings 36 and 38, as described above. Next, the screws 50 are inserted through the holes 51 and screwed into the threaded holes 48 until the entire valve housing assembly 18 is fixed in place and prestressed. To achieve sufficient strength in the valve housing assembly 18 for operation, the screws 50 are tightened, possibly using a torque wrench so that the peaks of material 148 on the contact surfaces 146 are pressed flat and thus produce a sufficient tension in the screws 50 and in the valve housing assembly 18 due to their deformation resistance and in this way the valve housing assembly 18 is given sufficient strength. The required screw tension is thus achieved before the opposed sets of upper and lower surfaces 60 and 64, and 66 and 68 come into contact in the areas not roughened. Since the material peaks 148 are higher than any irregularities in the surfaces 60, 64, 66 and 68 and sufficient strength has already been achieved for the valve housing assembly 18 before these come into contact, no deformation occurs in the valve housings 36 and 38, and particularly in the central portions 70 and 72, which could lead to strains in the area of the valve spools 78 and 80 and the axial bores 74 and 76 receiving them. This freedom from stress in the region of the valve spools 78 and 80 ensures that they can slide freely in the axial bores 74 and 76. Depending on the shape and the material of the peaks 148, their deformation may be either elastic or plastic.

Figure 3:
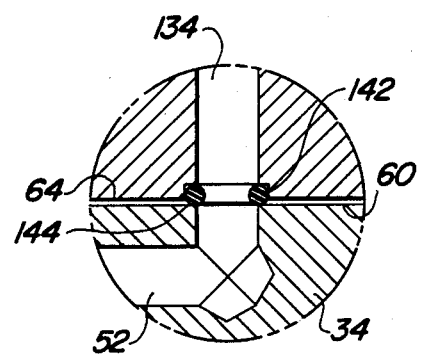
FIG. 3 shows a detail section in the area of circle 3 in FIG. 1.
Figure 4:
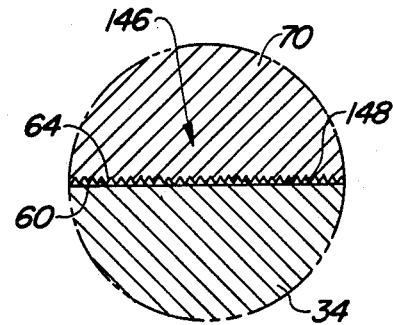
FIG. 4 is a detail section in the area of circle 4 in FIG. 1.

FIGS. 3 and 4 illustrate how the joint between the upper and lower surfaces 60 and 64 looks in the area of the sealing ring 144 and in the area of the contact surfaces 146.

Here, FIG. 3 shows that the sealing ring 144 contacts both the lower surface 64 and also the upper surface 60, while these are still at a slight distance apart. However, the sealing ring 144 still performs its sealing function. In FIG. 4, on the other hand, the upper surface 60 and the lower surface 64 are in contact at the peaks 148.

The specification of the permissible roughness of 3/100 to 5/100 mm is not generally valid, but is matched to this example since the surfaces at the interfaces of the baseplate 34 and valve housing 36 and of the valve housings 36 and 38 must be relatively flat in order to ensure a good fit for the cap 86 and good functioning of the adjusting device. In other applications, the surface roughness may be greater or smaller; however, it must always be greater than the largest irregularity in the opposing surface.

Other applications arise whenever at least two parts must be joined at a surface without any intermediate shim. An example is the construction of a control plate with electric or hydraulic control elements on a frame where no warping can be allowed in the control plate to prevent switching errors. Such a surface treatment would also be appropriate for highly precise bearings, as for turbines. Another example of an application occurs in the design of supports for ceramics, glass insulators or shears of the same material.

I claim:

1. In a spool valve assembly including at least first and second parts, with the first part being a valve housing containing a valve spool, reciprocably mounted in a valve bore, and including a first planar surface paralleling a longitudinal axis of the valve bore and with the second part including a second planar surface disposed in confronting relationship to the first planar surface, a plurality of clamping screws located in respective openings arranged in the first and second parts in perpendicular relationship to the first and second planar surfaces, and a plurality of contact surfaces respectively located adjacent each screw and between the first and second planar surfaces and functioning to keep the first and second planar surfaces separated from each other when the screws are tightened to clamp the first and second parts together, the improvement comprising: said contact surfaces respectively being in the form of knurled areas formed on and projecting away from one of and being engaged with the other of the first and second planar surfaces.

2. The spool valve assembly defined in claim 1 wherein said plurality of screws are at least four in number and are arranged with first and second pairs respectively on opposite sides of said longitudinal axis.

3. The spool valve assembly defined in claim 2 wherein the first and second pairs of screws and the contact surfaces respectively associated therewith are arranged symmetrically on opposite sides of the longitudinal axis of the bore.

4. The spool valve assembly defined in claim 3 wherein the contact surfaces associated with each screw comprise a pair of rectangular areas of knurling located on opposite sides of an associated screw.

5. The spool valve assembly defined in claim 1 or 8 wherein the height of the knurling from said one of the first and second planar surfaces before tightening the screws is sufficiently greater than any irregularities in the first and second planar surfaces that the latter remain separated after the screws have been tightened to establish a required tension therein and the knurling has been deformed by contact with said other of the first and second planar surfaces.

* * * * *

UNITED STATES PATENT AND TRADEMARK OFFICE
CERTIFICATE OF CORRECTION

PATENT NO. : 4,905,967

DATED : 6 March 1990

INVENTOR(S) : Richard Satzke

It is certified that error appears in the above-identified patent and that said Letters Patent is hereby corrected as shown below:

Column 6, line 55, change "8" to -- 4 --.

Signed and Sealed this

Twenty-first Day of May, 1991

*Attest:*

HARRY F. MANBECK, JR.

*Attesting Officer*  *Commissioner of Patents and Trademarks*